No. 615,329. Patented Dec. 6, 1898.
J. WHITELEY.
APPARATUS FOR TREATING FLUIDS.
(Application filed Dec. 27, 1897.)
(No Model.) 2 Sheets—Sheet 1.
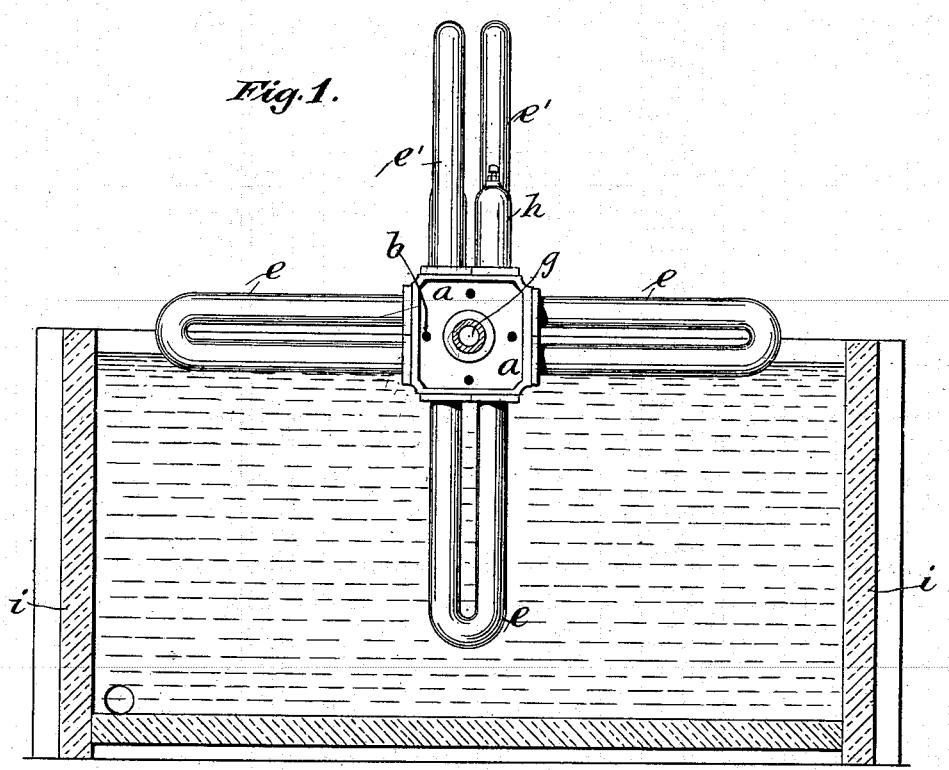
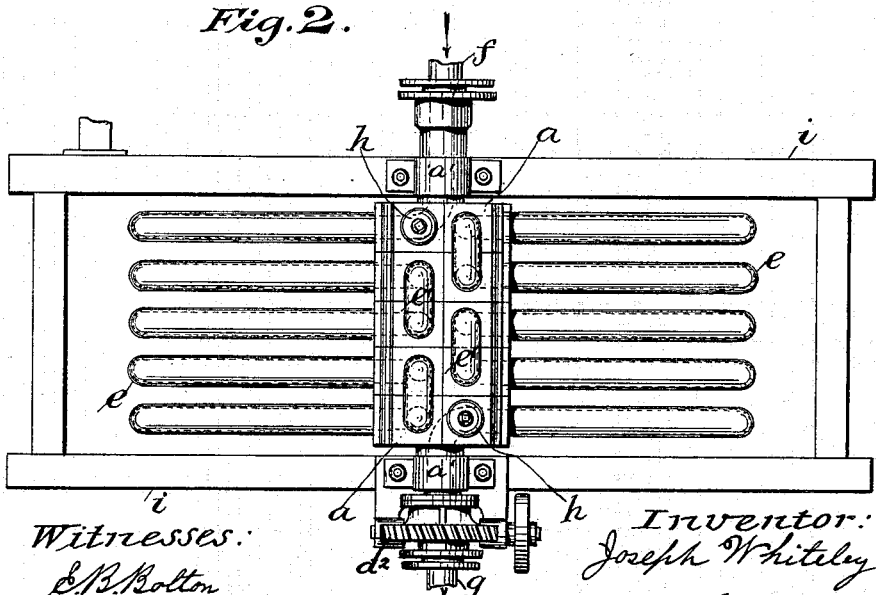
Witnesses: Inventor:
E. B. Bolton Joseph Whiteley
By his Attorneys No. 615,329. Patented Dec. 6, 1898.
J. WHITELEY.
APPARATUS FOR TREATING FLUIDS.
(Application filed Dec. 27, 1897.)
(No Model.) 2 Sheets—Sheet 2.
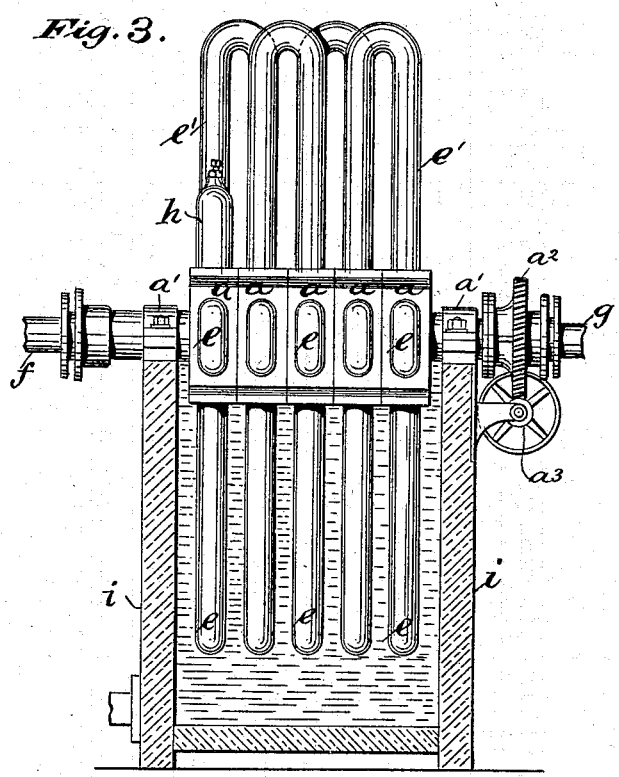
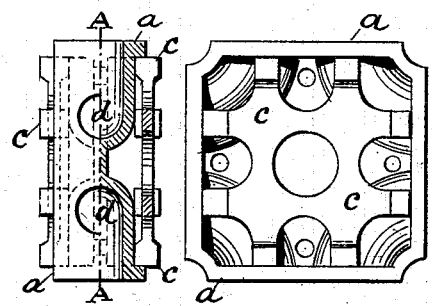
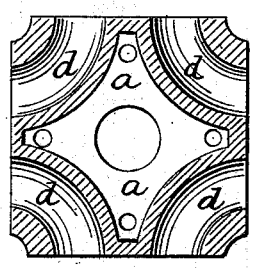
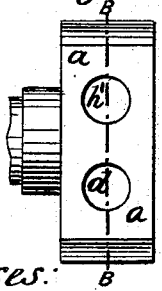
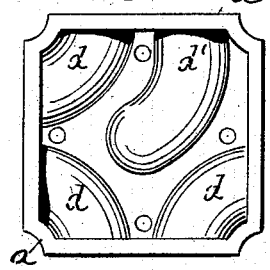
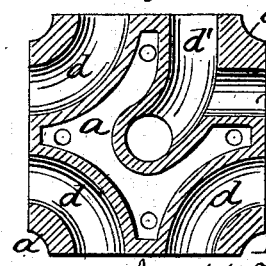
Witnesses:
E. B. Bolton
Inventor:
Joseph Whiteley
By
his Attorneys
THE NORRIS PETERS CO., PHOTO-LITHO., WASHINGTON, D. C.

UNITED STATES PATENT OFFICE.

JOSEPH WHITELEY, OF SALFORD, ENGLAND.

APPARATUS FOR TREATING FLUIDS.

SPECIFICATION forming part of Letters Patent No. 615,329, dated December 6, 1898.

Application filed December 27, 1897. Serial No. 663,575. (No model.)

*To all whom it may concern:*

Be it known that I, JOSEPH WHITELEY, a subject of the Queen of Great Britain, residing at Salford, in the county of Lancaster, England, have invented new and useful Improvements in Apparatus for Treating Fluids, (for which Richard Henry Turner and I have obtained a patent in Great Britain, No. 3,627, dated February 11, 1897,) of which the following is a specification.

My invention relates to improvements in apparatus for treating fluids, the object being the construction of an apparatus which is adapted to rotate and which will present a large working surface in comparison to the space occupied. I attain this object by the mechanism illustrated in the accompanying two sheets of drawings, in which—

Figure 1, Sheet I, is a vertical section, Fig. 2 a plan, and Fig. 3, Sheet II, a cross-section, of my improved apparatus shown adapted for cooling liquids or chemicals or for condensing steam. Figs. 4, 5, 6, 7, 8, and 9 are partly sections and partly views of details, Fig. 6 being a section through line A A of Fig. 4, and Fig. 9 through line B B of Fig. 7.

Similar letters refer to similar parts throughout the several views.

In carrying out my invention I form an axis $a$, having an inlet $f$ and an outlet $g$ in line with each other. Around this axis are secured rows of U or similar shaped pipes $e$ $e'$ in circular, spiral, or straight fashion, through which the liquid, vapor, or material to be treated is circulated, entering at $f$ and leaving at $g$. The said axis is mounted in suitable bearings $a'$ and slowly rotated by suitable gearing, such as a worm-wheel $a^2$, secured upon the outlet $g$, and a worm $a^3$ in gear therewith.

By preference I form the hollow axis of the apparatus hereinbefore referred to longitudinally in sections or blocks $a$, so as to be capable of being secured together by bolts $b$ or other suitable means in any desired number. The sections or blocks $a$ I may form externally triangular, square, hexangular, or of other suitable angular shape—in the present instance square. In order to set the said sections or blocks square with each other, a frame $c$ is placed between each two sections or blocks, fitting half-way into the same, as shown in Figs. 4 and 5, or in lieu of the said frame projections may be cast on one section or block adapted to fit into the adjacent one, as will be readily understood. Each of the said sections or blocks $a$ has ports $d$ formed across their corners, (see Figs. 4, 5, and 6,) which are adapted to communicate with U or other suitably shaped pipes $e$ $e'$, bolted or otherwise secured thereto. Two or more of the pipes $e$, as the case may be, are secured upon each of the sections or blocks $a$ in a circle, while the pipe $e'$ is fixed at a right or any other suitable angle to the pipes $e$, one member being bolted or otherwise secured to the one section or block $a$ and the other member to the adjacent one, (see more particularly Figs. 1, 2, and 3,) so as to form communication between each two sections or blocks $a$ successively.

The outer sections or blocks $a$ of the apparatus (see Figs. 7, 8, and 9) have each a port $d'$, which leads to the center of the axis of the apparatus and which are formed with or coupled to the inlet and outlet pipes $f$ and $g$, respectively.

In some cases I may fix to the section or block $a$ at the inlet and outlet end of the axis of the apparatus a safety-valve $h$, respectively, a port $h'$ being formed in the respective section or block to communicate with the inlet and outlet ports $d'$. (See more particularly Fig. 9.)

The liquid, which enters through the inlet-pipe $f$, circulates first through the pipes $e$, arranged in a circle on the respective section or block, then passes through the cross-pipe $e'$ to the pipes $e$ of the adjacent section or block, and so on successively until it reaches the outlet-pipe $g$. It will thus be readily understood that by increasing the number of the said sections or blocks or the length of the said circulating-pipes any size of apparatus, according to the capacity required, can be built rapidly.

When using my improved apparatus for cooling liquids or chemicals or for condensing steam, I employ same in an open (or closed) vessel $i$, as shown in the drawings, wholly or partly filled with water and without the said scrapers, while when using same for mixing the said vessel or chamber may be dispensed with.

What I claim as my invention, and desire to secure by Letters Patent, is—

1. In combination, the axis comprising a series of sections each having independent ports therethrough and the series of pipes connected therewith so that the fluid circulates through the pipes and ports in succession from an inlet at one end of the axis to an outlet at the other, substantially as described.

2. In combination, the axis comprising a series of sections having ports therethrough, the pipe connections radiating from the sections and connected with the ports thereof and the pipes $e'$ extending from one section to the next section, substantially as described.

In witness whereof I have hereunto set my hand in presence of two witnesses.

JOSEPH WHITELEY.

Witnesses:
FERD. BOSSHARDT,
STANLEY E. BRAMALL.